United States Patent [19]

Newhall et al.

[11] 3,950,886

[45] Apr. 20, 1976

[54] INSECT ELECTROCUTION DEVICE

[75] Inventors: Albert F. Newhall, Peabody; Clinton Rule, Beverly Farms, both of Mass.

[73] Assignee: Rule Industries, Inc., Gloucester, Mass.

[22] Filed: Jan. 13, 1975

[21] Appl. No.: 540,575

[52] U.S. Cl. .................................. 43/112; 43/113
[51] Int. Cl.² .................... A01M 1/04; A01M 1/22
[58] Field of Search .............................. 43/112, 113

[56] References Cited
UNITED STATES PATENTS

| | | | |
|---|---|---|---|
| 1,823,892 | 9/1931 | Galbraith | 43/112 |
| 3,177,609 | 4/1965 | DeMarco | 43/112 |
| 3,305,965 | 2/1967 | Cornell | 43/113 X |
| 3,319,374 | 5/1967 | Gawne | 43/112 |
| 3,473,251 | 10/1969 | Kahn | 43/112 |
| 3,835,577 | 9/1974 | Soulos | 43/112 |

*Primary Examiner*—Louis G. Mancene
*Assistant Examiner*—Daniel J. Leach
*Attorney, Agent, or Firm*—William N. Anastos

[57] ABSTRACT

There is disclosed herein an insect electrocution device comprising an electrocution cage having means for applying a high voltage thereto and at least one insect attracting lighting arrangement disposed therein. Each insect attracting lighting arrangement comprises an insect attractant light source disposed substantially within the focus of an outwardly-facing parabolic reflector. The size and number of the lighting arrangements employed are sufficient to substantially fill the length of the electrocution cage and provide the visual effect of a single band of light of uniform intensity emanating from the entire length thereof.

9 Claims, 3 Drawing Figures

INSECT ELECTROCUTION DEVICE

FIELD OF THE INVENTION

The present invention relates generally to insect electrocution devices and is more particularly concerned with insect electrocution cage devices comprising insect attractant light means.

Insect electrocution devices comprising an electrocution cage, means to supply a high-voltage potential to said cage, and an insect attractant light source disposed within said cage are well known in the art. In recent years, fluorescent lighting tubes have gained general favor over incandescent lamps for use as the insect attractant light source. Even more particularly, fluorescent lighting tubes designed for relatively high efficiency in the near ultraviolet wave length band of the light spectrum are presently often employed for this purpose. Further details concerning various insect electrocution devices of the general type outlined above may be had by reference to such patent literature as U.S. Pat. Nos. 2,465,574; 2,799,117; 3,177,609; 3,473,251; 3,768,196 and 3,835,577.

OBJECTS OF THE INVENTION

It is a principal object of the present invention to provide novel improved insect electrocution devices.

It is another object of the present invention to provide insect electrocution devices comprising more efficient insect attractant lighting means.

It is another object of the present invention to provide insect electrocution devices comprising insect attractant lighting means which provide substantial design flexibility and manufacturing ease in scaling of the basic device to different sizes.

Other objects and advantages of the present invention will in part be obvious and will in part appear hereinafter.

SUMMARY OF THE INVENTION

The improved insect electrocution device of the invention broadly comprises an electrocution cage, means to supply a high-voltage potential thereto, and at least one insect attractant lighting arrangement disposed in said cage, each said arrangement comprising a ring-form, outwardly facing, parabolic reflector having disposed substantially within the geometric focus thereof an insect attractant tubular light source.

THE DRAWINGS

DESCRIPTION OF PREFERRED EMBODIMENTS

Figure 1:
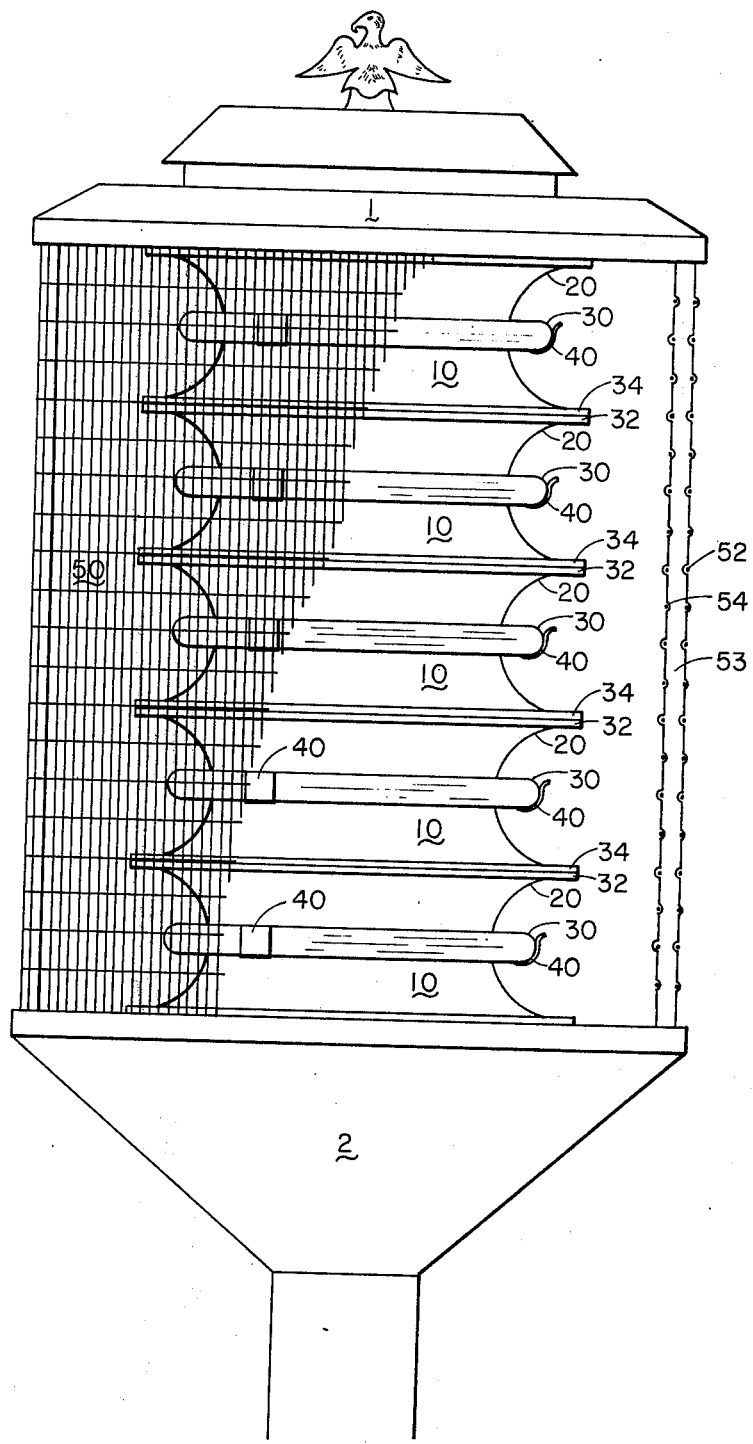
FIG. 1 is a schematic, diagrammatic side view, partially in section, of an insect electrocution device of the invention.
Figure 2:
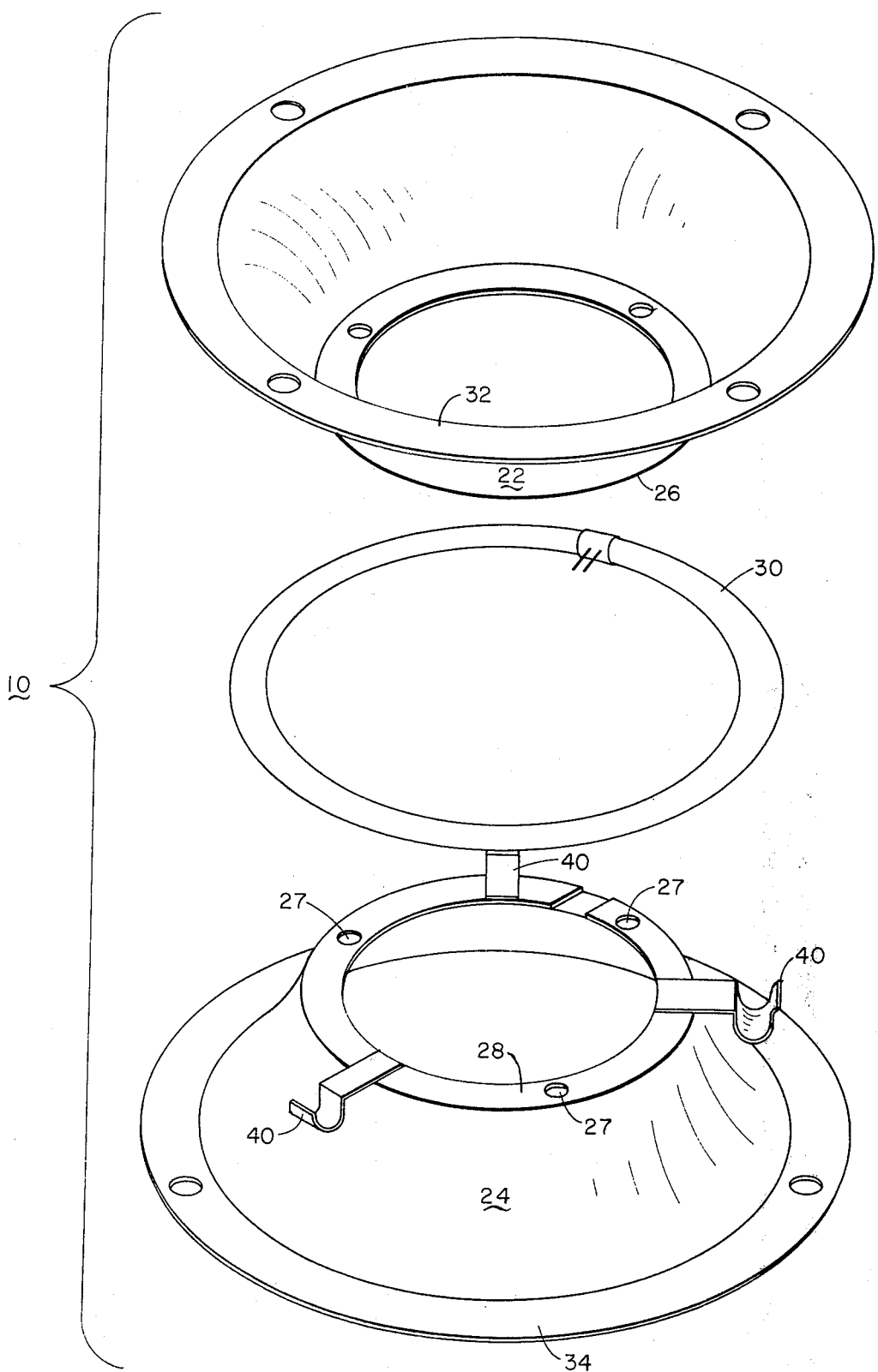
FIG. 2 is an exploded perspective view of one embodiment of the light arrangement of the invention.

Referring now to FIGS. 1 and 2, wherein like reference numerals refer to like structures, the insect electrocution device of the invention broadly comprises electrocution cage 50 and means, not shown, for applying a high-voltage potential thereto. Cage 50 can comprise an interior electrode grid 54 disposed coaxially within and electrically isolated from an exterior electrode grid 52, thereby to form an annular space 53 therebetween. Cage 50 is placed in parallel with a suitable high-voltage power source, such as a step-up transformer. Desirably, the ground leg of said source is connected to grid 52 and the high potential leg of said source is connected to grid 54. The spacing of the electrode elements is sufficiently large as to allow insects to gain access to space 53 formed between grids 52 and 54, the intrusion causing short circuiting or at least a spark jump across both grids, and resulting in the electrocution of the insects.

Alternatively, cage 50 can also take the form of a number of spaced apart electrode elements formed into a single cage form structure. In that embodiment, the cage form electrode element array is provided alternately with ground and charged high potential electrode elements. Such electrocution age structures are known in the art and have been disclosed, for instance, in aforementioned U.S. Pat. No. 2,465,574, H. S. Brown et al., Mar. 29, 1949.

Disposed within cage 50 is at least one insect attractant lighting arrangement 10, comprising a ring-form outwardly facing parabolic reflector 20, having disposed substantially within the geometric focus thereof, a tubular insect attractant light source 30. Reflector 20 can be polygonal and thus be served by a plurality of straight tubular light sources each arranged in the focus of a parabolic reflector element section forming a side of the polygon. However, in the interests of simplicity, economy and ease of construction, it is much preferred that reflector 20 be circular and be served by circular light source 30. It is a further preferred embodiment of the invention that reflector 20 be separable into two halves, 22 and 24, the parting line therebetween being defined preferably by the parabolic vertex. By this feature, shown clearly in FIG. 2, light source 30 is rendered readily accessible for removal and replacement. Internal flanges 26 and 28, extending inwardly from reflector halves 22 and 24, respectively, provide structure by which said reflector halves can be mated and secured together. Flanges 26 and 28 can be provided with corresponding apertures 27 through which suitable fasteners, such as screws, bolts and nuts, rivets and the like are employed to fasten together corresponding reflector halves 22 and 24. Alternatively, reflector halves 22 and 24 can also be held together by means of clip fasteners or other functional equivalents thereof.

While light source 30 can be of the incandescent variety, it will ordinarily be preferred that a tubular fluorescent lamp be utilized. Especially preferred for use as source 30 are commercially available fluorescent lamps adapted for insect attraction by their relatively high emissivity in the near ultraviolet regions of the light spectrum. Ballast, high voltage power supply, and other items comprising the devices can normally be conveniently housed within housing elements 1 and/or 2, or behind reflector (s) 20.

An important feature of the invention resides in the relationship of light source 30 lying within the geometric focus of parabolic reflector 20, and accordingly, there are provided suitably dimensioned stand-offs 40 adapted to hold source 30 in proper spaced relationship within the focus of reflector 20.

Referring particularly to FIG. 1, it will be seen that lighting arrangements 10 of the invention are readily employed in stacked array thereof. This, of course, represents a marked benefit in affording substantial leeway in choosing the overall length of an electrocution device while preserving simplicity and commonality of parts. Therefore, in another preferred embodiment of the invention, there is utilized a stacked array of arrangements 10 of sufficient length as to completely fill the length of cage 50.

For purposes of providing support structure for stacking arrangements 10, each reflector half 22 and 24 can be provided with an external flange, 32 and 34, extending outwardly. This, of course, provides each reflector 20 with convenient mating and support surfaces for stacking, and for securing to one another in a manner similar to that discussed above with reference to the fastening of reflector halves 22 and 24.

Reflector 20 can be formed from a large variety of materials including sheet metals such as aluminum,, mild steel, copper, brass or stainless steel, and polymeric materials such as those of the acrylonitrile-butadiene-styrene, polymide, polystyrene, polybutyrate, polycarbonate or polyester families. Further, the reflective surface of reflector 20 can be prepared by any suitable technique such as by polishing, electroplating, electroless or chemical plating. If desired, the reflective surface of reflector 20 can also be coated with a suitable protective film.

The visual effects resulting from the employment of the insect attractant lighting arrangement 10 of the invention are remarkable. Specifically, in viewing, the light emanating from each arrangement 10 is seen as a uniform, intense band of light extending substantially completely across the entire width of each reflector 20. Indeed, it is often difficult for the human eye to resolve and distinguish light source 30 from the background of reflector 20. In the preferred embodiment of the invention wherein plural arrangements 10 are employed in stacked array, the human eye generally perceives a single band of light of uniform intensity and having a width substantially equal to the entire length of the stacked array. These visual effects are particularly striking when compared with those provided by lighting arrangements wherein no parabolic reflector is employed and/or wherein tubular light source 30 is positioned substantially outside the focus of reflector 20. Under either of these last-mentioned conditions, the light appears as a narrow band having a width equal to or only somewhat greater than the diameter of the light source. Too, the intensity of the light band viewed under these last-mentioned conditions is often found to be non-uniform. Most importantly, however, the insect electrocution devices of the invention are superior to those of the prior art in terms of their insect luring efficiency when utilizing a given wattage light source. For example, it has been demonstrated that the light received by a light meter placed on a plane horizontally disposed and 2 feet away from a device of the present invention, as illustrated in FIG. 1, and comprising a single lighting arrangement 10 (i.e., comprising a single reflector 20 and a single tubular light source 30), is more than twice as much as is the light received under identical conditions from an identical device lacking only parabolic reflector 20.

Figure 3:
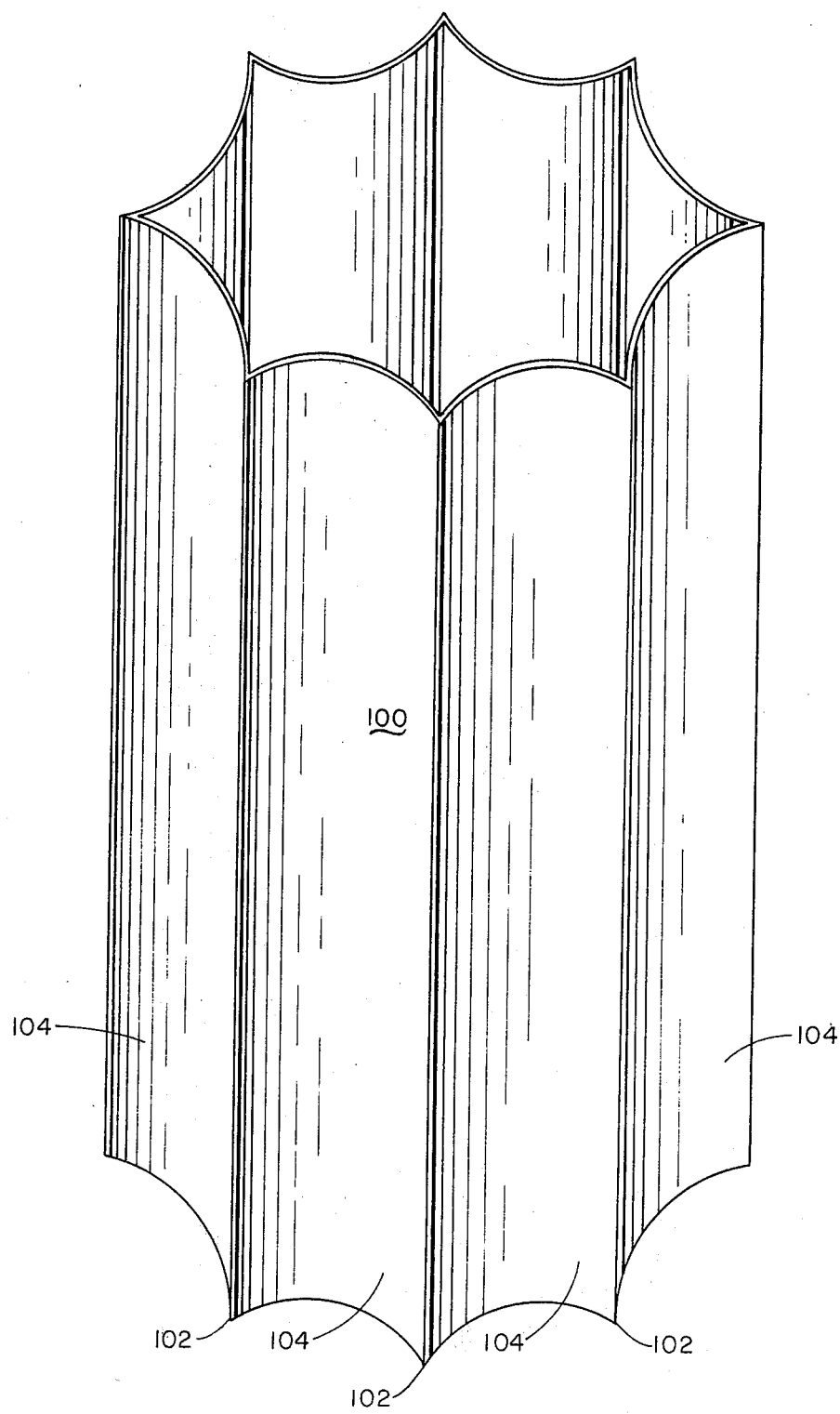
FIG. 3 is a schematic perspective view of another embodiment of a ring-form parabolic reflector useful in the practice of the invention.

Obviously, many changes can be made in the above description without departing from the spirit of the invention. For example, where the devices of the invention comprise a plurality of lighting arrangements, referring now to FIG. 3, the parabolic reflectors thereof can be provided by a vertically fluted cylinder 100 wherein the external surfaces lying between adjacent flutes 102 comprise vertically oriented, outwardly facing parabolic reflectors 104. In this instance, of course, parabolic reflectors 104 are each served by a separate light source (not shown).

Thus, while this invention has been described with respect to certain specific embodiments thereof, it should be understood that various modifications can be made without departing from the spirit and scope thereof.

What is claimed is:

1. In an insect electrocution device of the character described and comprising an electrocution cage, means to apply a high-voltage potential to said cage and an insect attracting light disposed within said cage, the improvement which comprises: said insect attraction light comprising at least one lighting arrangement, each said arrangement comprising an outwardly facing parabolic reflector and an insect attractant tubular light source disposed substantially within the focus of said parabolic reflector, the number and size of said arrangements disposed within said electrocution cage being sufficient to substantially completely fill the length thereof and to provide the visual effect of a single band of light of uniform intensity emanating from substantially the entire length thereof.

2. The insect electrocution device of claim 1 wherein said tubular light source is a fluorescent lamp.

3. The insect electrocution device of claim 2 wherein said fluorescent lamp is near-ultraviolet light emissive.

4. The insect electrocution device of claim 1 comprising a plurality of said lighting arrangements.

5. The insect electrocution device of claim 1 wherein said parabolic reflector and said tubular light source are circular.

6. The insect electrocution device of claim 5 wherein said circular parabolic reflector comprises a pair of separable halves adapted for mating.

7. The insect electrocution device of claim 6 wherein said paired circular parabolic reflector halves are each provided with an internal flange.

8. The insect electrocution device of claim 1 comprising a plurality of said lighting arrangements in stacked array.

9. The insect electrocution device of claim 8 wherein each parabolic reflector is provided with external flange means extending outwardly and adapted for stacking.

* * * * *